(12) United States Patent
Rödbro et al.

(10) Patent No.: US 10,314,091 B2
(45) Date of Patent: Jun. 4, 2019

(54) OBSERVATION ASSISTED BANDWIDTH MANAGEMENT

(71) Applicant: Microsoft Technology Licensing, LLC, Redmond, WA (US)

(72) Inventors: Christoffer Asgaard Rödbro, Stockholm (SE); Mingyu Chen, Stockholm (SE); Adriana Dumitras, London (GB); Jonathan David Rosenberg, Freehold, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 13/828,721

(22) Filed: Mar. 14, 2013

(65) Prior Publication Data

US 2014/0273990 A1    Sep. 18, 2014

(51) Int. Cl.
*H04W 76/14*    (2018.01)
*H04W 28/20*    (2009.01)

(52) U.S. Cl.
CPC ............ *H04W 76/14* (2018.02); *H04W 28/20* (2013.01)

(58) Field of Classification Search
CPC . H04W 72/02; H04W 72/0406; H04W 72/04; H04W 28/18; H04W 28/20; H04W 28/22; H04W 28/16
USPC ............................................... 455/452.2, 405
See application file for complete search history.

(56) References Cited

U.S. PATENT DOCUMENTS

| | | | |
|---|---|---|---|
| 7,409,450 B2 | 8/2008 | Jorgensen | |
| 7,477,621 B1 | 1/2009 | Loc et al. | |
| 7,480,297 B2 | 1/2009 | Ramanna et al. | |
| 8,149,771 B2 | 4/2012 | Khivesara et al. | |
| 8,259,570 B2 | 9/2012 | Rodbro et al. | |
| 8,745,209 B2 * | 6/2014 | Lloyd | H04L 69/04 370/229 |
| 2002/0120745 A1 * | 8/2002 | Oishi | H04L 47/10 709/226 |
| 2005/0163059 A1 | 7/2005 | Dacosta et al. | |
| 2006/0023644 A1 * | 2/2006 | Jang | H04L 12/1813 370/261 |
| 2006/0064497 A1 | 3/2006 | Bejerano et al. | |
| 2011/0096770 A1 * | 4/2011 | Henry | 370/352 |

(Continued)

FOREIGN PATENT DOCUMENTS

| | | |
|---|---|---|
| CN | 101971664 A | 2/2011 |
| WO | WO-2009113976 | 9/2009 |
| WO | 2011075670 A1 | 6/2011 |

OTHER PUBLICATIONS

"Manual Chapter—Managing Traffic with Bandwidth Controllers", Retrieved from <http://support.f5.com/kb/en-us/products/big-ip_ltm/manuals/product/tmos-implementations-11-3-0/8.html> on Mar. 14, 2013, (Dec. 17, 2012), 6 pages.

(Continued)

*Primary Examiner* — Said M Elnoubi
(74) *Attorney, Agent, or Firm* — Schwegman Lundberg & Woessner, P.A.

(57) ABSTRACT

Observation assisted bandwidth management techniques are described. In one or more implementations, a request is received at a terminal to initiate a call with another terminal. Responsive to the request, a communication is formed to be communicated to a service provider for bandwidth parameters, the request including network parameters associated with the terminal. The bandwidth parameters, received form the service provider, are used as part of a model to estimate an amount of bandwidth that is available for the call. The call with the other terminal is initiated, the call configured to at least initially consume the estimated amount of bandwidth.

20 Claims, 10 Drawing Sheets

(56) References Cited

U.S. PATENT DOCUMENTS

| | | | |
|---|---|---|---|
| 2011/0153816 A1 | 6/2011 | Lloyd et al. | |
| 2011/0205889 A1 | 8/2011 | Chen et al. | |
| 2011/0299542 A1* | 12/2011 | Karaoguz | G06Q 20/10 370/401 |
| 2012/0014252 A1* | 1/2012 | Martin | H04W 28/20 370/235 |
| 2012/0094708 A1 | 4/2012 | Park et al. | |
| 2012/0157109 A1* | 6/2012 | Li | H04W 28/20 455/450 |
| 2013/0246575 A1* | 9/2013 | Giaretta | H04L 41/00 709/218 |
| 2014/0141793 A1* | 5/2014 | Bello | H04W 28/20 455/452.2 |

OTHER PUBLICATIONS

Marchese, et al., "Adaptive Call Admission and Bandwidth Control in DVB-RCS", *Proceedings of IEEE International Conference on Communications*, (Jun. 5, 2011), 9 pages.

Staehle, et al., "Aquarema in Action—Improving the YouTube QoE in Wireless Mesh Networks", Available at <http://phobos.informatik.uni-wuerzburg.de/research/mnrg/aquareyoum/aquareyoum/Aquarema.pdf>,(Feb. 16, 2011), 8 pages.

Swaminathana, et al., "Bandwidth-Demand Prediction in Virtual Path in ATM Networks Using Genetic Algorithms", *Journal of Computer Communications*, vol. 22, Issue 12, Available at <http://www.cs.ucsb.edu/~almeroth/classes/F99.595N/1581.pdf>,(Jul. 1999), pp. 1127-1135.

Winstein, et al., "Alfalfa: A Videoconferencing Protocol for Cellular Wireless Networks", *MIT Computer Science and Artificial Intelligence Laboratory*, Cambridge, Mass., Cited by the inventors in the disclosure document),(2013),13 pages.

"International Search Report and Written Opinion", Application No. PCT/US2014/022894, dated Sep. 19, 2014, 16 Pages.

"Second Office Action Issued in Chinese Patent Application No. 201480014930.0", dated Aug. 3, 2018, 5 Pages.

"First Office Action and Search Report Issued in Chinese Patent Application No. 201480014930.0", dated Jan. 2, 2018, 10 Pages.

\* cited by examiner

OBSERVATION ASSISTED BANDWIDTH MANAGEMENT

BACKGROUND moon Bandwidth management may involve a variety of different challenges, including the problem of optimizing a network connection for use by a computing device, such as for use by an application involving network access. Conventional techniques for bandwidth management, however, could be inaccurate, especially when faced with a wireless network connection.

For example, in conventional techniques an application tried to estimate instantaneous available bandwidth of a channel and then transmit at that rate. This approach was generally employed for conventional wired connections such as ASDL, where the bandwidth is relatively constant over time and therefore this technique could be a good predictor in such instances. However, the approach may be problematic on wireless channel where the available bandwidth may vary rapidly over time. Therefore, reliance upon instantaneously available bandwidth as in conventional techniques may not be a good indication of the future bandwidth.

SUMMARY

Observation assisted bandwidth management techniques are described. In one or more implementations, a request is received at a terminal to initiate a call with another terminal Responsive to the request, a communication is formed to be communicated to a service provider for bandwidth parameters, the request including network parameters associated with the terminal. The bandwidth parameters, received from the service provider, are used as part of a model to estimate an amount of bandwidth that is available for the call. The call with the other terminal is then initiated, the call configured to at least initially consume the estimated amount of bandwidth.

In one or more implementations, a system includes one or more modules implemented at least partially in hardware. The one or more modules are configured to perform operations that include collecting data from a plurality of terminals, the data describing variability of bandwidth of wireless network access experienced by respective terminals. The operations also include assigning bandwidth parameters that are based on the collected data to one or more of a plurality of clusters, the assigning based on network parameters associated with the data that are collected from the respective terminals. The operations further include distributing one or more of the bandwidth parameters responsive to a request, the distributed one or more bandwidth parameters located from a respective cluster based on network parameters included as part of the request.

In one or more implementations, one or more computer-readable storage media have instructions stored thereon that, responsive to execution by a computing device, causes the computing device to perform operations that include making estimations during a call between the computing device and another computing device that describe an amount of bandwidth that is available at particular times during the call. The operations also include adjusting bandwidth used to make the call based at least in part on the estimations and forming a communication to be communicated to a service provider, the communication including network parameters that describe characteristics of a network used to make the call and data based on the estimations made during the call regarding the amount of bandwidth.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques that were utilized to predict bandwidth were often limited to an estimate of instantaneously available bandwidth. This, however, could be inaccurate in instances in which the available bandwidth could vary greatly, such as in wireless networks.

Accordingly, observation assisted bandwidth management techniques are described. In one or more implementations, techniques are described in which network usage of a wireless network is observed by a computing device, which may include amount of bandwidth available and reasons for that availability, such as quality-of-service and so on.

This observation may then be leveraged by the computing device and/or another computing device to determine an amount of bandwidth that is expected for that computing device for another instance of network usage. Further, these observations may be clustered based on observed characteristics, which may include time of day, day of week, hardware resources utilized, type of network, network provider, signal strength, and so on. Thus, a computing device that is to make a "call" for instance may locate a cluster having similar characteristics and use observations associated with the cluster to make a prediction regarding available bandwidth. Other examples are also contemplated as further described in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
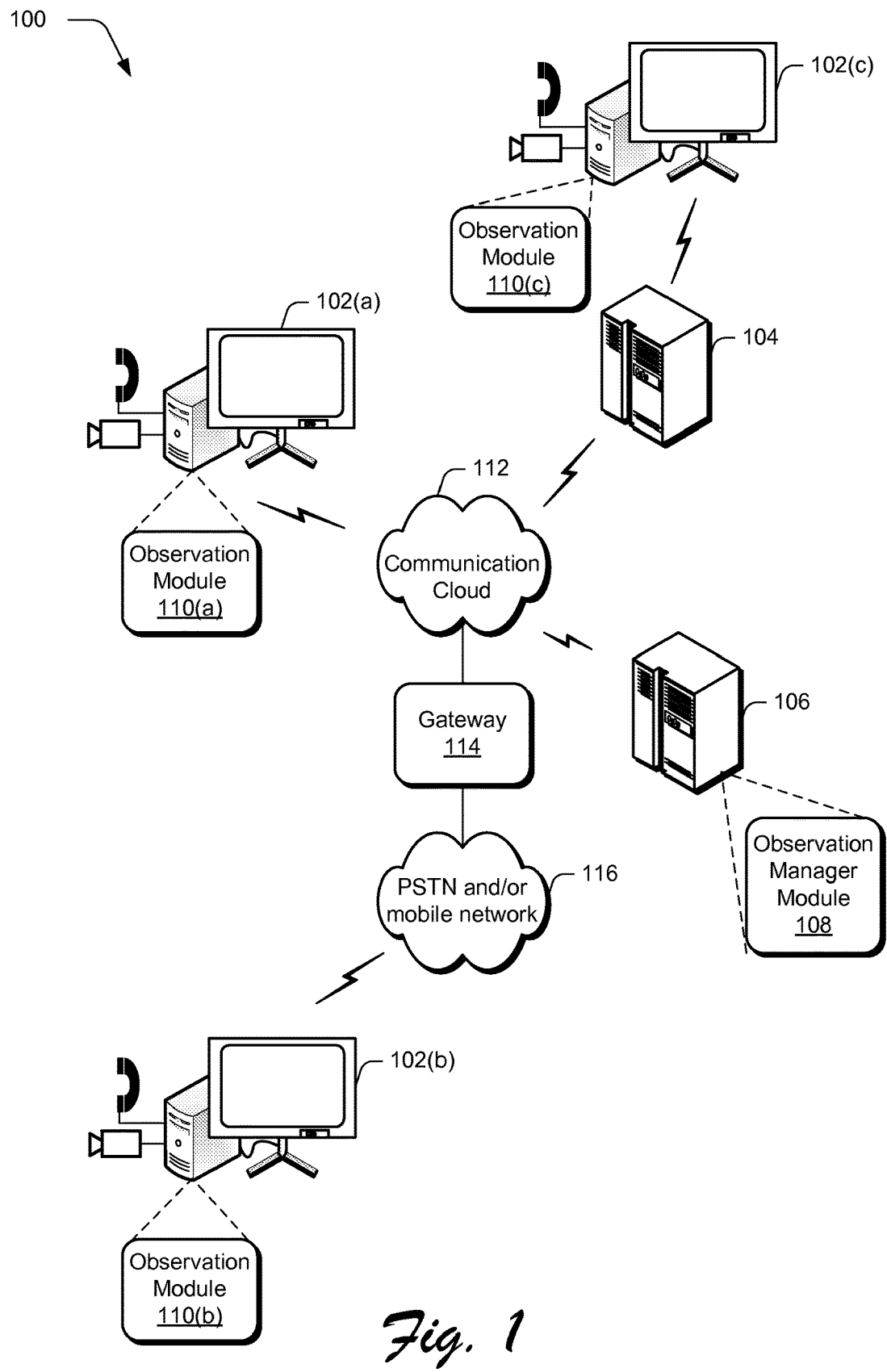
FIG. 1 is an illustration of an environment in an example implementation that is operable to perform observation techniques described herein.

FIG. 1 is a schematic illustration of a communication system 100 operable to employ techniques described herein. The communication system 100 includes a plurality of computing devices. These computing devices include end-user terminals 102(a), 102(b), and 102(c) such as desktop or laptop PCs or Internet-enabled mobile phones, a server 104, such as a peer-to-peer server of an Internet-based communication system or a traditional server configured to enable client/server communication, and a server 106.

The server 106 is illustrated as including an observation manager module 108. Each of the end-user terminals 102(a)-102(c) are also illustrated as including a respective observation module 110(a)-110(c). These modules are representative of functionality that is operable, alone or in part, to implement the observation assisted network access techniques described herein. For example, these modules may be used to collect data that describes observed bandwidth by one or more of the end-user terminals 102(a)-102(c). This data may then be leverage by the end-user terminals 102(a)-102(c) or other terminals to generate parameters regarding expected bandwidth, which may be taken into account when choosing a transmission rate in an incoming and/or outgoing direction as further described below.

The communication system 100 is also illustrated as including a communications cloud 112 and a gateway 114 to another type of network 116, such as to a traditional Public-Switched Telephone Network (PSTN) or other circuit switched network, and/or to a mobile cellular network. It will of course be appreciated that many more elements make up a network than those explicitly shown. This is represented schematically in FIG. 1 by a communications cloud 112 which typically includes many other end-user terminals, servers and gateways, as well as routers of Internet service providers (ISPs) and Internet backbone routers.

The communications cloud 112 may be representative of a packet-based network, which is illustrated in the form of the Internet although other examples are also contemplated. Accordingly, the communication cloud 112 may include a plurality of interconnected elements as described above. In this example, each network element may be connected to the rest of the Internet, and is configured to communicate data with other such elements over the Internet by transmitting and receiving data in the form of Internet Protocol (IP) packets. Alternately or additionally, networks other than the Internet can be utilized. For example, PSTN can route calls via non-IP protocols, the network may include wireless networks such as Wi-Fi, cellular (e.g., 3G, LTE), and so on. In addition, calling can take place within private networks rather than the Internet. In at least some implementations, each element also has an associated IP address locating it within the Internet, and each packet includes a source and destination IP address in its header, although other implementations are also contemplated.

A variety of different types of communication may be supported by the environment 100. Examples include, but are not limited to, video services, voice services, video/voice services, text services, Web services, and the like. In the illustrated and described embodiment, end-user terminals 102(a) to 102(c) can communicate with one another, as well as other entities, by way of the communication cloud 112 using any suitable techniques. Thus, end-user terminals can communicate through the communication cloud 112, through the communication cloud 112, gateway 114 and network 116, or through server 106 using, for example Voice over IP (VOIP).

In at least some instances, in order to communicate with another end user terminal, a client module executing on an initiating end user terminal acquires the IP address of the terminal on which another client module is installed. This can be done using an address look-up or any suitable technique.

Some Internet-based communication systems are managed by an operator, in that they rely on one or more centralized, operator-run servers for address look-up (not shown). In that case, when one client is to communicate with another, then the initiating client contacts a centralized server run by the system operator to obtain the callee's IP address, an example of which is illustrated by server 106, which may be representative of one or more servers, such as a server farm. Other approaches can be utilized. For example, in some server-based systems, call requests are received by the server and media is relayed by the server. In this instance, there is not an end-to-end connection between the clients, but rather a server in between for the communication that takes place.

In contrast to these operator managed systems, another type of Internet-based communication system is known as a "peer-to-peer" (P2P) system. Peer-to-peer (P2P) systems typically devolve responsibility away from centralized operator servers and into the end-users' own terminals. This means that responsibility for address look-up is devolved to end-user terminals like those labeled 102(a) to 102(c).

Each end user terminal can run a P2P client application such that each such terminal forms a node of the P2P system. P2P address look-up may be implemented by distributing a database of IP addresses amongst some of the end user nodes. The database is a list which maps the usernames of all online or recently online users to the relevant IP addresses, such that the IP address can be determined given the username. The above constitutes but an example only. It is to be appreciated and understood that other approaches can be utilized without departing from the spirit and scope of the claimed subject matter. For example, some systems can utilize multiple IP addresses or utilize uniform resource identifiers (URIs) which have domain name system (DNS) names.

Once known, the address allows a user to establish a voice or video call, or send an instant message (IM) chat message or file transfer, etc. Additionally however, the address may also be used when the client itself needs to autonomously communicate information with another client.

Figure 2:
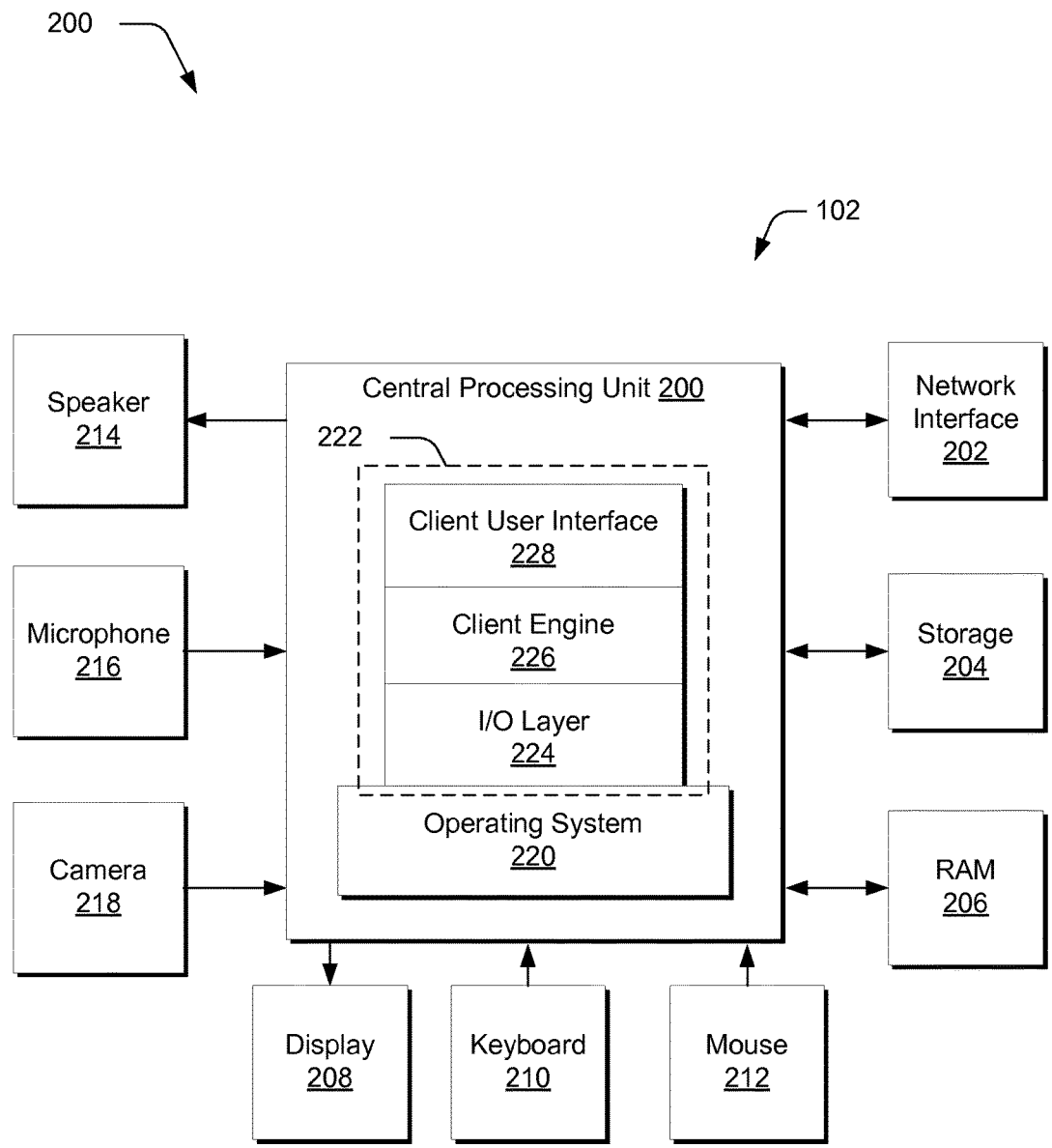
FIG. 2 is a schematic block diagram that shows an example of an end-user terminal which is configured to act as a terminal of a system operating over the Internet.

The schematic block diagram of FIG. 2 shows an example of an end-user terminal 102 which is configured to act as a terminal of a system operating over the Internet. The system may comprise a P2P system and/or a non-P2P system and may use one or more different protocols to communicate. The terminal 102 comprises one or more processors, illustrated as CPU 200, which is operatively coupled to: a network interface 202 such as modem or other interface for connecting to the Internet, a non-volatile storage device 204 such as a hard-drive or flash memory, and a volatile memory device such as a random access memory (RAM) 206. The terminal 102 also comprises one or more user input devices, for example in the form of a keyboard or keypad 210, a mouse 212, a microphone 216 and a camera 218 such as a webcam, each operatively coupled to the CPU 200. The terminal 102 further comprises one or more user output devices, for example in the form of a display 208 and speaker 214, again each operatively coupled to the CPU 200.

The storage device 204 stores software including at least an operating system (OS) 220, and packet-based communication software in the form of a client application 222 which may comprise a P2P application and/or a non-P2P application through which communication can take place over a network, such as the networks described in FIG. 1. On start-up or reset of the terminal 102, the operating system 220 is automatically loaded into the RAM 206 and from there is run by being executed on the CPU 200. Once running, the operating system 220 can then run applications, such as the client application 222, by loading them into the into the RAM 206 and executing them on the CPU 200. To represent this schematically in FIG. 2, the operating system 220 and client application 222 are shown within the CPU 200.

In this particular non-limiting example, the client application 222 comprises a "stack" having three basic layers: an input and output (I/O) layer 224, a client engine layer 226, and a client user interface (UI) layer 228. The functionality of these layers can be implemented by an architecture other than the one specifically depicted without departing from the spirit and scope of the claimed subject matter.

Each layer or corresponding functionality module is responsible for specific functions. Because each successive layer usually communicates with two adjacent layers (or one in the case of the top layer), they are regarded as being arranged in a stack as shown in FIG. 2.

The client application 222 is said to be run "on" the operating system 220. This means that in a multi-tasking environment it is scheduled for execution by the operating system 220; and further that inputs to the lowest (I/O) layer 224 of the client application 222 from network interface 202, microphone 216 and camera 218 as well as outputs from the I/O layer 224 to network interface 202, display 208 and speaker 214 may be mediated via suitable drivers and/or APIs of the operating system 220. In at least some embodiments, the client application 222 can be implemented to include a web-based interface that can be utilized to present audiovisual and interactive content.

The I/O layer 224 of the client application comprises a voice engine and optionally a video engine in the form of audio and video codecs which receive incoming encoded streams and decodes them for output to speaker 214 and/or display 208 as appropriate, and which receive un-encoded audio and/or video data from the microphone 216 and/or camera 218 and encodes them for transmission as streams to other end-user terminals 102 of a P2P system, or other entities in a PSTN and/or mobile network such as network 108. The I/O layer 224 may also comprise a control signaling protocol for signaling control information between terminals 102 of the network.

The client engine layer 226 then handles the connection management functions of the system as discussed above, such as establishing calls or other connections by P2P address look-up and authentication, as well as by other techniques. The client engine may also be responsible for other secondary functions of the system such as supplying up-to-date contact lists and/or avatar images of the user to the server 104 (FIG. 1); or retrieving up-to-date contact lists of the user and retrieving up-to-date avatar images of other users from the server 104.

The client user interface layer 228 is responsible for presenting decoded content, such as audiovisual and/or interactive content to the user via the display 208, for presenting the output on the display 208 along with other information such as presence and profile information and user controls such as buttons and menus, and for receiving inputs from the user via the presented controls.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors. Further discussion of a device that is operable to perform these techniques may be found in relation to FIGS. 9 and 10.

Returning back to FIG. 1, as previously described bandwidth management typically revolves around the problem of optimizing utilization of the bandwidth on a communication channel. Conventionally, an estimate was based instantaneous available bandwidth of a channel, which was then used to transmit at that rate. While this may be a good approach for conventional wired connection such as ASDL where the bandwidth is relatively constant over time, this approach may suffer when confronted with communication channels having rapidly varying bandwidth.

One technique that has been developed models the insecurity of the future bandwidth and picks a sending rate dependent on this model, taking into account that for real-time communications over-utilization may be more harmful than under-utilization. This technique is based on actual observations which are obtained for that particular communications session, meaning that the approach does not have an impact at the beginning of a voice or video call. Moreover, this approach may not take into account common but infrequent events such as traffic shaping effects.

Accordingly, techniques are described in which bandwidth management leverages observations made during other communication sessions, e.g., other calls. At call startup, for example, a query may be made to a service provider that is available via a network (e.g., a cloud service, web service, and so on) for parameters regarding expected bandwidth for a communication session, which may include insecurity and/or variability expected for the communication session. These parameters may then be taken into account when choosing a transmission rate in incoming and/or outgoing direction. In another example, the service provider may be updated with observations made during the communication session, e.g., a "call." Other examples are also contemplated, such as support of a P2P system as described earlier in which these parameters are distributed amongst the end-user terminals 102(a) to 102(c) and located in a manner similar to the lookup example described in relation to FIG. 2 above.

For example, consider bandwidth "BW" as a time varying process. Without loss of generality, "BW(t+Δ)=BW(t)+dBW (t,Δ)", where "BW(t)" is the bandwidth at time "t" and "dBW(t,Δ)" is the change in bandwidth from time "t" to time "t+Δ". Techniques to estimate "BW(t)" may be based on observations of reception times, transmission times, packet sizes and packet loss at initialization may be used to pick a sending rate equal to or slightly lower than this estimate. However, this estimate involves a delay of at least one network round trip time (RTT). Consequently, that RTT basically becomes the "Δ" above. If "dBW(t,Δ)" takes on a positive value, it means that the channel is not being used to its full potential, but if it is negative the channel may become overloaded resulting in queuing delays and/or packet loss.

Accordingly, techniques may also be employed to predict "BW(t+Δ)" as a "safe" value to transmit at a bandwidth at which a confidence has been reached that "BW(t+Δ)" will not be exceeded. For example, a history of "BW(t)" estimates may be used to model a probability density function (PDF) for the future bandwidth. The PDF may take the form of a Possion distribution which has one parameter or assume a variety of other forms. In one or more implementations, these techniques may be employed to then pick the lower fifth percentile of this PDF, meaning there is risk of five percent of overshooting the available bandwidth.

These techniques may then be expanded by generating and sharing observations. In the following discussion, voice/video real-time communications as a "call" are described as examples meaning that an "application invocation" corresponds to a call. That is, the observations made by one user in one communications session (e.g., call) are reused by another user in another communications session, e.g., call. An example system is described as follows and shown in a corresponding figure.

Figure 3:
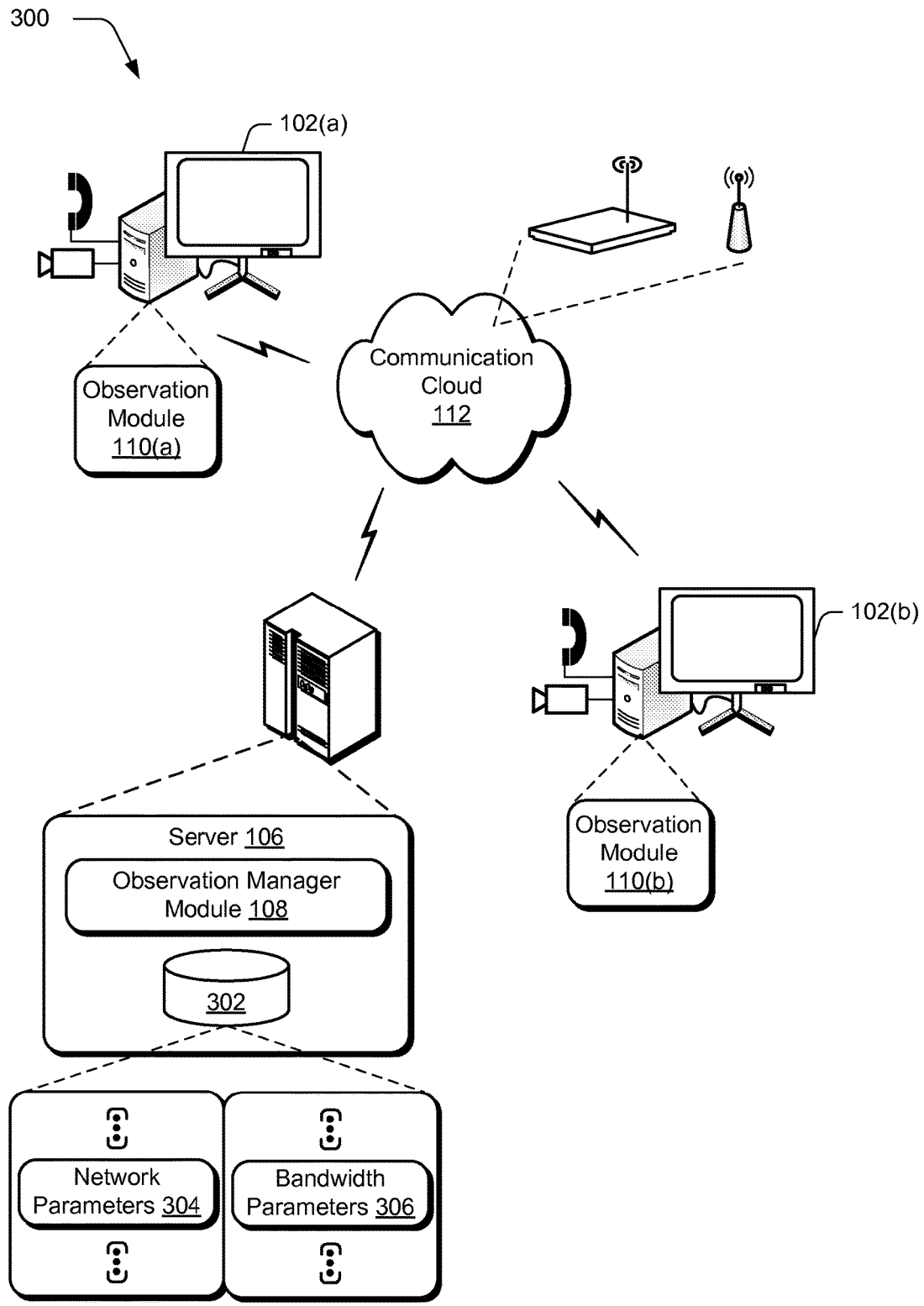
FIG. 3 depicts a system in an example implementation that is configured to generate and leverage parameters usable to predict bandwidth.

FIG. 3 depicts a system 300 in an example implementation that is configured to generate and leverage parameters usable to predict bandwidth. The system 300 includes the endpoints 102(a), 102(b) as being communicatively coupled to a communication cloud 112 as before. In this example, the communication cloud 112 includes support for wireless communication techniques. This may include wireless access points and cellular towers as illustrated, as well as other wireless communication techniques which may include Wi-Fi (e.g., one or more standards including IEEE 802.11 and others) near field communication (NFC), Bluetooth, and so on.

The endpoints 102(a), 102(b) may participate in communication sessions as previously described, such as with each other, with other endpoints, and so on. During this communication session, parameters may be generated based on observations made by respective observation modules 110(a), 110(b). The parameters may then be communicated to a server 106 of a service provider for storage in one or more databases 302 by an observation manager module 108. As previously described, other distributed implementations are also contemplated. These parameters may take a variety of forms.

For example, parameters may describe a network provider, signal strength, network communication device, wireless access point, geographical location, network access type, network protocol, time of day, day of week, subscription information, or roaming information. Additionally, these parameters may be expressed for one or both sides of the call. Accordingly, these observations may be referred to as "network (NW) parameters" 304 in the following discussion.

Bandwidth parameters 306, on the other hand, may involve parameters of a statistical model used to calculate the bandwidth distribution, which may include parameters observed by the observation modules 110(a), 110(b) during a communication session. For example, a model may be configured as a Poisson distribution as previously described which may employ bandwidth parameters 306 estimated during a communication session. Accordingly, the bandwidth parameters 306 may be used to describe these estimations as part of a model. These parameters may be generated and leveraged in a variety of ways, an example of which is described as follows and shown in a corresponding figure.

Figure 4:
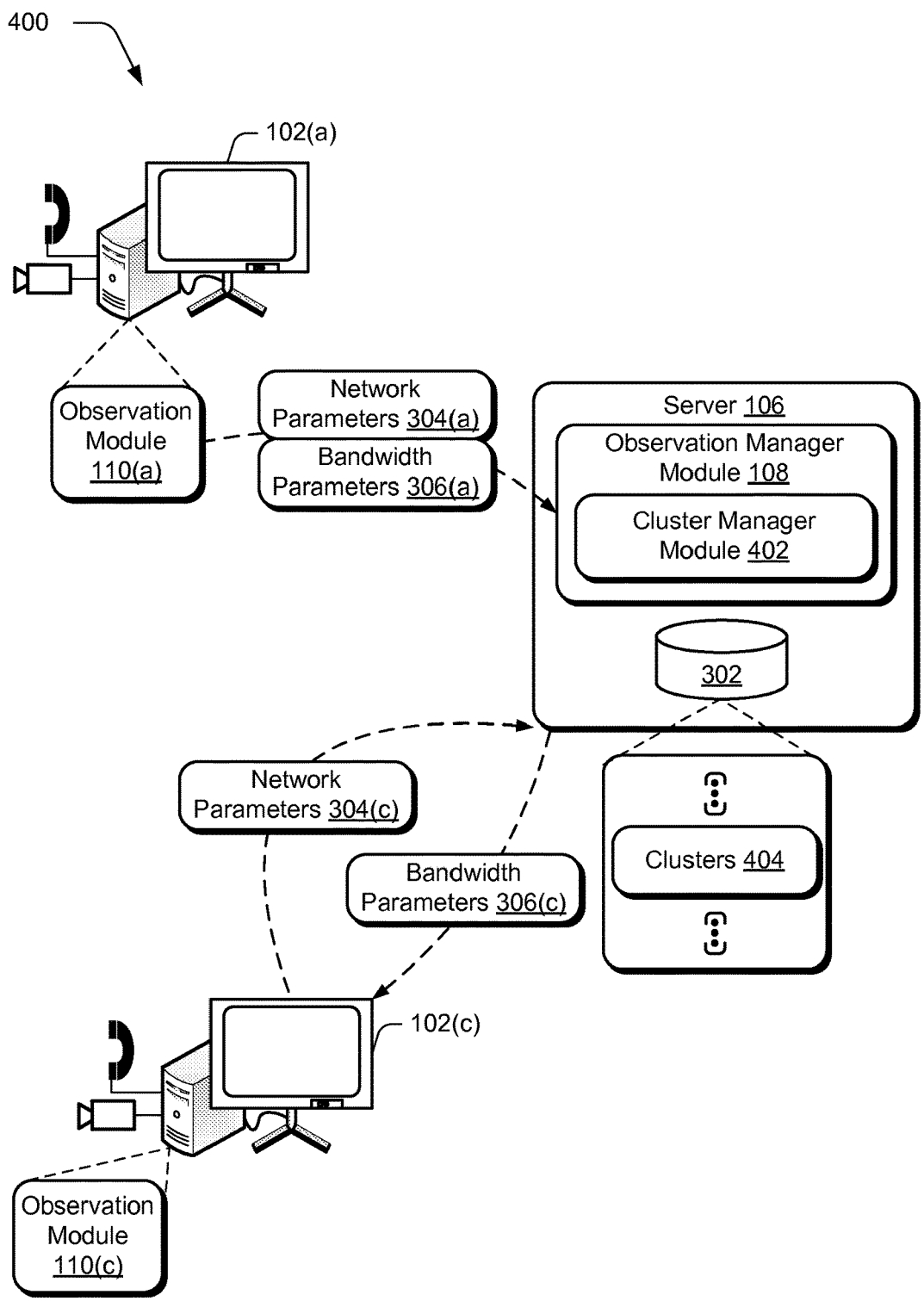
FIG. 4 depicts an example of a system of FIGS. 1 and 3 in which observations of bandwidth parameters made by a first endpoint are leveraged by a second endpoint.

FIG. 4 depicts an example of a system 400 of FIGS. 1 and 3 in which observations of bandwidth parameters made by a first endpoint are leveraged by a second endpoint. A terminal 102(a) may include an observation module 110(a) as previously described. The observation module 110(a) may make observations based on one or more communication sessions, e.g., calls as described above. These observations may include estimates of bandwidth made during the communication sessions, which may be used to generate bandwidth parameters 306(a) as previously described. For example, the bandwidth parameters 306(a) may be used as part of a statistical model for a bandwidth distribution that are updated during a communication session.

These observations may also include network parameters 304(a) which describe characteristics of devices and other infrastructure that was involved in the communication sessions, such as network provider, signal strength, network communication device, wireless access point, network protocols, and so on. Thus, the network parameters 304(a) may describe parts or all of an end-to-end network connection that was involved in the bandwidth parameters 306(a).

In this example, the observations of the network and bandwidth parameters 304(a), 306(a) are communicated via a network to the observation manager module 108, which may be implemented as a service provider as previously described. Other examples are also contemplated, such as to employ a distributed architecture that does not include a service provider, such as in a P2P configuration.

The observation manager module 108 is illustrated as including a cluster manager module 402. The cluster manager module 402 is representative of functionality to cluster the observations, which may be used as a basis to control which observations are disseminated to which terminals for usage.

For example, after a call the network and bandwidth parameters 304(a), 306(a) may be communicated to the observation manager module 108 as described above. A cluster manager module 402 may then be used to assign the parameters of the call to one or more of a plurality of clusters 404 according to the network parameters 204(a). The bandwidth parameters 306(a) may also be taken into account in this clustering.

The one or more clusters to which the call was assigned may then be updated with the bandwidth parameters 306(a) received from the endpoint 102(a) by the cluster manager module 402. In one or more implementations, weighting may be applied as part of this updating according to clustering assignment confidence. That is, more than one cluster may be updated if using soft cluster assignment and weights may be employed that are based on a confidence score computed as part of the assignment. These clusters 404 of parameters may then be leveraged by another device to estimate bandwidth availability.

Terminal 102(c), for instance, may receive an input to initiate a call via a network. In response, network parameters 304(c) may be communicated by the terminal 102(c) to the observation manager module 108 via a network. The observation manager module 402 may then use to network parameters 304(c) to locate one or more of the clusters 404 that correspond to the call. Bandwidth parameters 306(c) that are associated with this cluster 404 may then be communicated back to the endpoint 102(c) for use in making an estimate regarding expected bandwidth for the call. In this way, these parameters may be used to begin at an estimate that is based on more than just current network conditions and without waiting for a round trip as was previously required to adjust the estimate. Other examples are also contemplated as further described below in associated with a corresponding figure.

Figure 5:
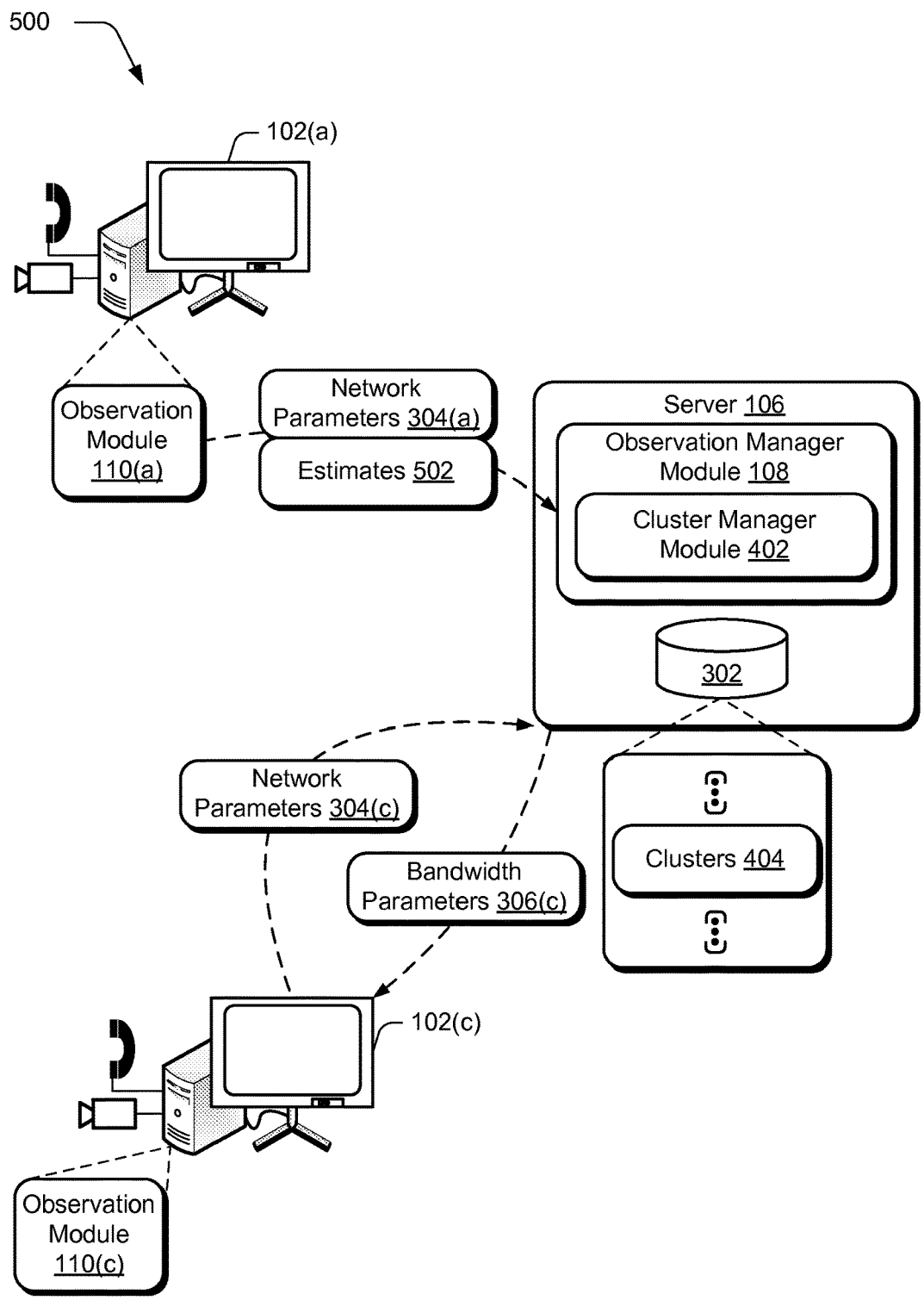
FIG. 5 depicts a system in an example implementation in which generation of bandwidth parameters is performed by the observation manager module.

FIG. 5 depicts a system 500 in an example implementation in which generation of bandwidth parameters is performed by the observation manager module 108. As before, the terminal 102(a) includes an observation module 110(a) as previously described. The observation module 110(a) may make observations based on one or more communication sessions, e.g., calls as described above. These observations may include estimates 502 of bandwidth made during the communication sessions, which may then be communicated with network parameters 304(a) to the observation manager module 108.

The observation manager module 108 may then extract bandwidth parameters 306(c) from the estimates 502 which may be assigned to clusters 404 and communicated to other clients 102(c) as previously described.

This in this example improved parametric bandwidth models can be employed with improved efficiency because data for calculation of the parameters may be readily available from previous versions stored in the database 302. However, this may involve an increase in data communication as the bandwidth parameters may be expressed as a compaction of a complete time series associated with a communication session, e.g., a call.

The bandwidth parameters may be used as part of models to express a variety of different characteristics that may involve bandwidth. For example, the bandwidth model may include "Quality of Service (QoS) models". That is, the model is also concerned with parameters such as RTT, packet loss and delay. This may improve bandwidth prediction strength, for example, when losses are observed a bandwidth decrease can be anticipated. Additionally, models may take a variety of forms, which may include machine learning techniques, statistical models, and so forth.

Further as previously described the techniques described herein may be employed in a variety of different environments. In one such example, the observation module 110(a) of a respective terminal 102(a) may employ algorithms that support local execution of the techniques. This may include training on offline data in which a predictor takes as inputs as the past "N" seconds of delay and loss, and predicts the available bandwidth. The client application, for instance, may collect traces of its measured delay, loss, and uploads those at the end of the call, so offline algorithms of the client application can train the predictor offline. In another example, updated predictor algorithms (model or parameters) may also be downloaded at defined intervals. Other examples are also contemplated, further discussion of which may be found in relation to the following section.

Example Procedures

The following discussion describes observation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made FIGS. 1-5.

Figure 6:
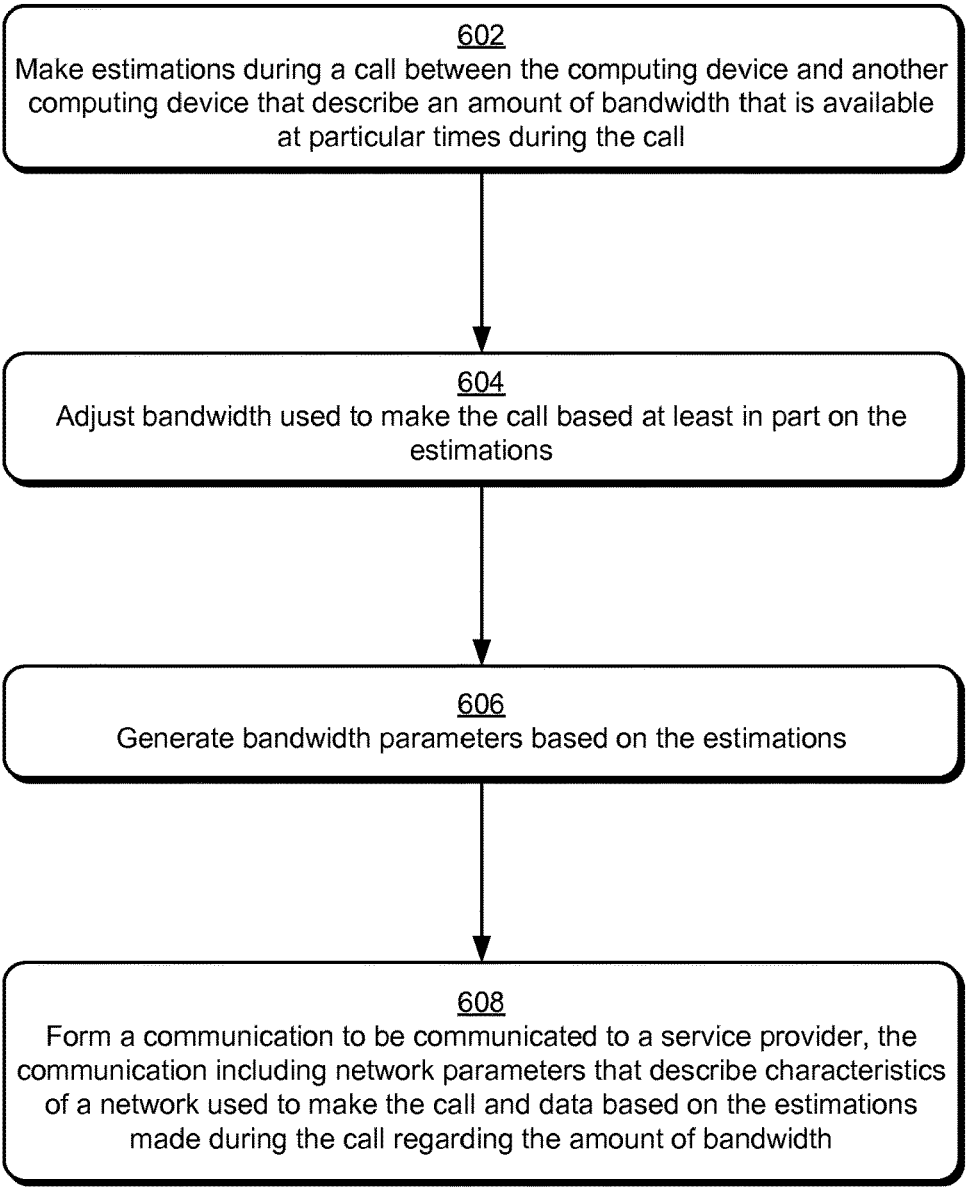
FIG. 6 is a flow diagram depicting a procedure in an example implementation in which estimates are made by a terminal and communicated to a service provider.

FIG. 6 depicts a procedure 600 in an example implementation in which estimates are made by a terminal and communicated to a service provider. Estimations are made during a call between the computing device and another computing device that describe an amount of bandwidth that is available at particular times during the call (block 602). A terminal 102(a), for instance, may receive one or more inputs from a user to initiate a call with terminal 102(c). Accordingly, observations made by an observation module 110(a) during that call may be captured, which may include network parameters which describe characteristics of a network used to make the call as well as information regarding bandwidth available via the network.

Bandwidth used to make the call is adjusted based at least in part on the estimations (block 604). The observation module 110(a), for instance, may employ a model that may be used to predict amounts of bandwidth available and adjust bandwidth consumption in making the call accordingly. The model may take a variety of forms as previously described.

Bandwidth parameters are generated based on the estimations (block 606). Thus, in this example the terminal 102(a) generated the parameters. Other examples are also contemplated, such as to generate the bandwidth parameters by a service provider as described in relation to FIG. 5.

A communication is formed that is to be communicated to a service provider, the communication including network parameters that describe characteristics of a network used to make the call and data based on the estimations made during the call regarding the amount of bandwidth (block 608). The communication may be configured in a variety of ways, such as to include network parameters 304(a) as described in relation to FIGS. 4 and 5. The communication may also include bandwidth parameters 306(a) that were generated locally at the terminal, estimates 502 that were used as part of the model, and so on.

Figure 7:
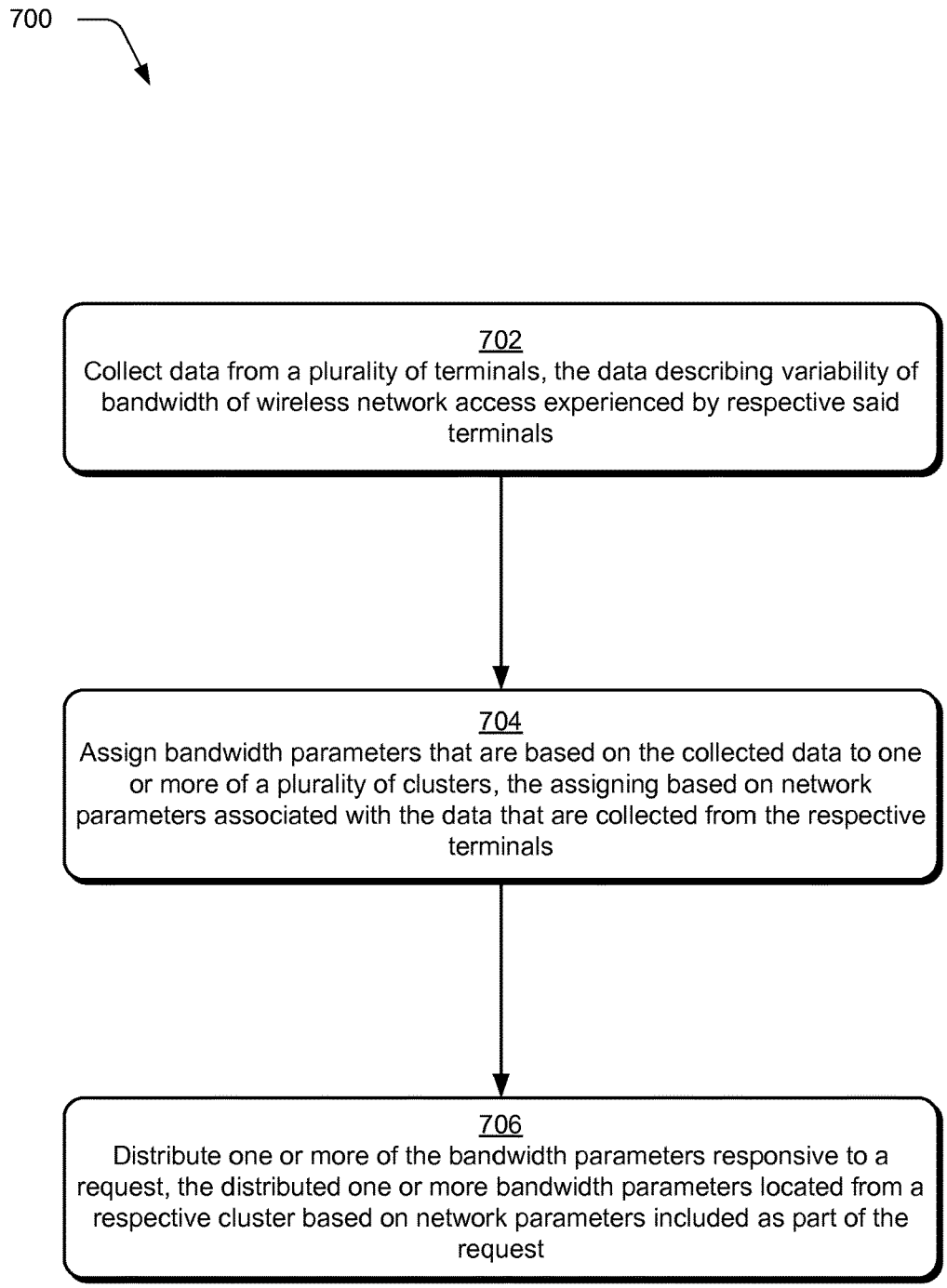
FIG. 7 is a flow diagram depicting a procedure in an example implementation in which data is collected and assigned to clusters for use in predicting bandwidth availability.

FIG. 7 depicts a procedure 700 in an example implementation in which data is collected and assigned to clusters for use in predicting bandwidth availability. Data is collected from a plurality of terminals, the data describing variability of bandwidth of wireless network access experienced by respective terminals (block 702). As before, observation modules may be used to collect data that describes bandwidth consumption (e.g., an amount at any one time) as well as how that bandwidth was consumed, (e.g., which devices and operational characteristics of the devices) such as to describe a call between terminals 102(a) and 102(b).

Bandwidth parameters are assigned that are based on the collected data to one or more of a plurality of clusters, the assigning based on network parameters associated with the data that are collected from the respective terminals (block 704). A cluster manager module 402, for instance, may assign bandwidth parameters to respective clusters 404 based on the network parameters.

One or more of the bandwidth parameters are then distributed responsive to a request, the distributed one or more bandwidth parameters located from a respective cluster based on network parameters included as part of the request (block 706). Another terminal 102(c), for instance, may then leverage the bandwidth parameters based on a call in which the terminal did not participate. The bandwidth parameters may be located in a respective cluster 404 using network parameters 304(c) that were received from the terminal 102(c). Other examples are also contemplated.

Figure 8:
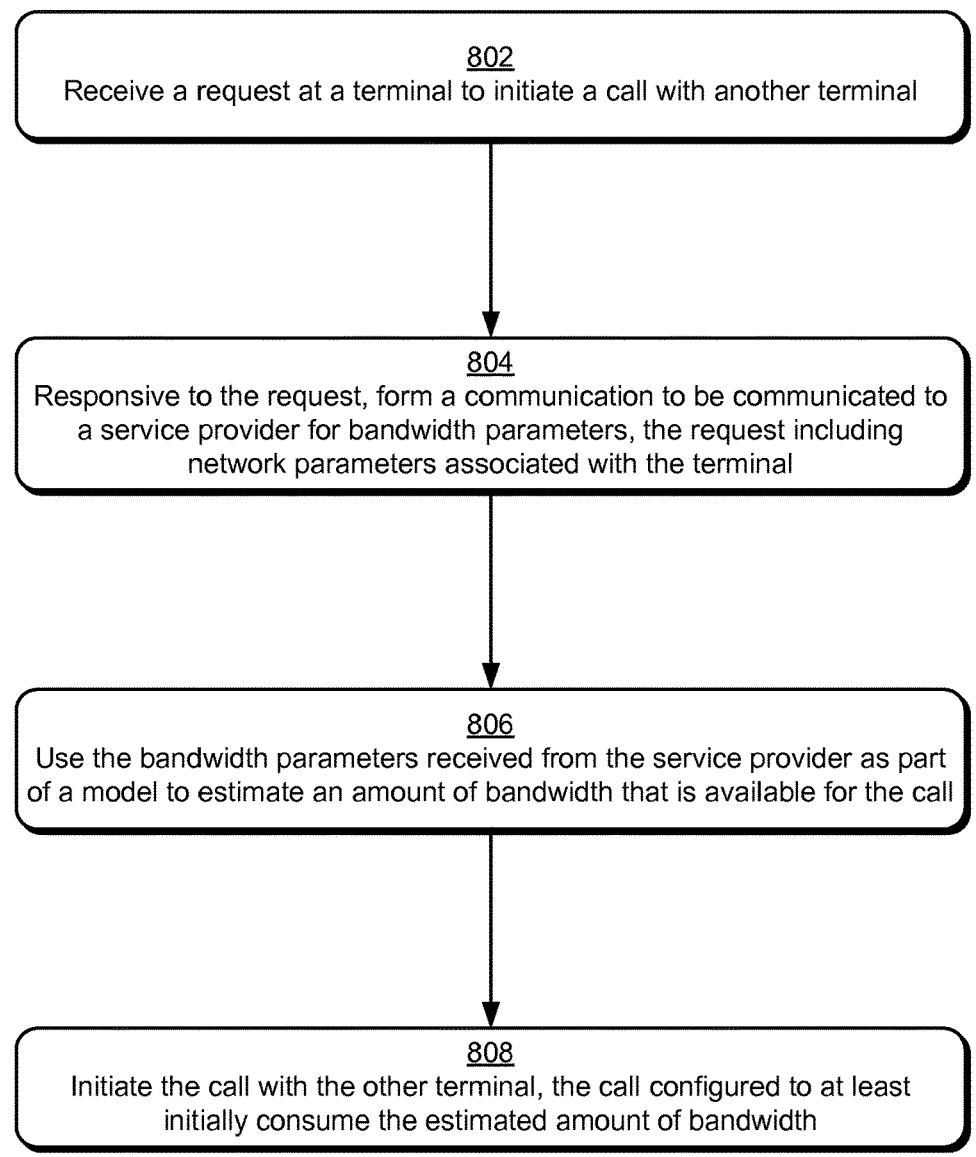
FIG. 8 is a flow diagram depicting a procedure in an example implementation in which bandwidth parameters are obtained from a service provider and used to estimate availability of bandwidth for a call.

FIG. 8 depicts a procedure 800 in an example implementation in which bandwidth parameters are obtained from a service provider and used to estimate availability of bandwidth for a call. A request is received at a terminal to initiate a call with another terminal (block 802). A user, for instance, may initiate a client application at terminal 102(a) to make a call to terminal 102(c).

Responsive to the request, a communication is formed to be communicated to a service provider for bandwidth parameters, the request including network parameters associated with the terminal (block 804). Continuing with the previous example, the client application may communicate network parameters to a service provider, such as server 106 for processing by the observation manager module 108. The observation manager module 108 may then locate bandwidth parameters based on the network parameters.

The bandwidth parameters, received from the service provider, are used as part of a model to estimate an amount of bandwidth that is available for the call (block 806). The observation module 110(a) of the terminal 102(a), for instance, may employ the parameters as part of a model to estimate an amount of available bandwidth via a network connection to make the call.

The call with the other terminal is initiated, the call configured to at least initially consume the estimated amount of bandwidth (block 806). In this way, an accurate estimation may be leveraged "right away" without waiting for the round trip as was conventionally required. Other examples are also contemplated as further described above, such as to "wait" for a reliable estimate to be obtained in-call before an adjustment is made.

Example System and Device

Figure 9:
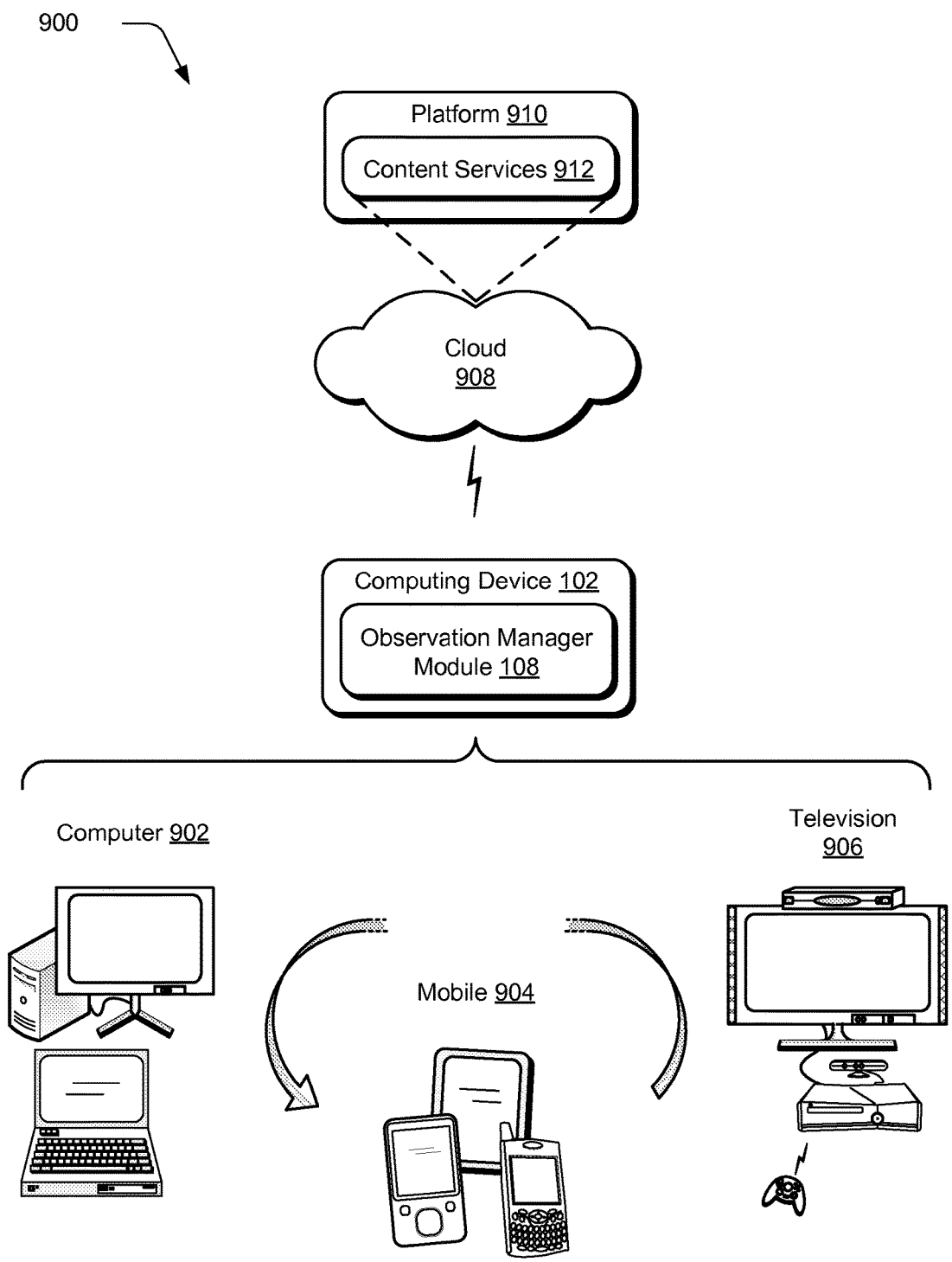
FIG. 9 illustrates an example system that includes a computing device as described with reference to FIG. 1.

FIG. 9 illustrates an example system 900 that includes the computing device 102 as described with reference to FIG. 1. The example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 902, mobile 904, and television 906 uses. Each of these configurations includes devices that may have generally different constructs and capabilities, and thus the computing device 102 may be configured according to one or more of the different device classes. For instance, the computing device 102 may be implemented as the computer 902 class of a device that includes a personal computer, desktop computer, a multi-screen computer, laptop computer, netbook, and so on.

The computing device 102 may also be implemented as the mobile 904 class of device that includes mobile devices, such as a mobile phone, portable music player, portable gaming device, a tablet computer, a multi-screen computer, and so on. The computing device 102 may also be implemented as the television 906 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. This is illustrated through use of the observation manager module 108 by any one of the computing devices, which may also be implemented "via the cloud" as further described below.

The cloud 908 includes and/or is representative of a platform 910 for content services 912. The platform 910 abstracts underlying functionality of hardware (e.g., servers) and software resources of the cloud 908. The content services 912 may include applications and/or data that can be utilized while computer processing is executed on servers that are remote from the computing device 102. Content services 912 can be provided as a service over the Internet and/or through a subscriber network, such as a cellular or Wi-Fi network.

The platform 910 may abstract resources and functions to connect the computing device 102 with other computing devices. The platform 910 may also serve to abstract scaling of resources to provide a corresponding level of scale to encountered demand for the content services 912 that are implemented via the platform 910. Accordingly, in an interconnected device embodiment, implementation of functionality of the functionality described herein may be distributed throughout the system 900. For example, the functionality may be implemented in part on the computing device 102 as well as via the platform 910 that abstracts the functionality of the cloud 908.

Figure 10:
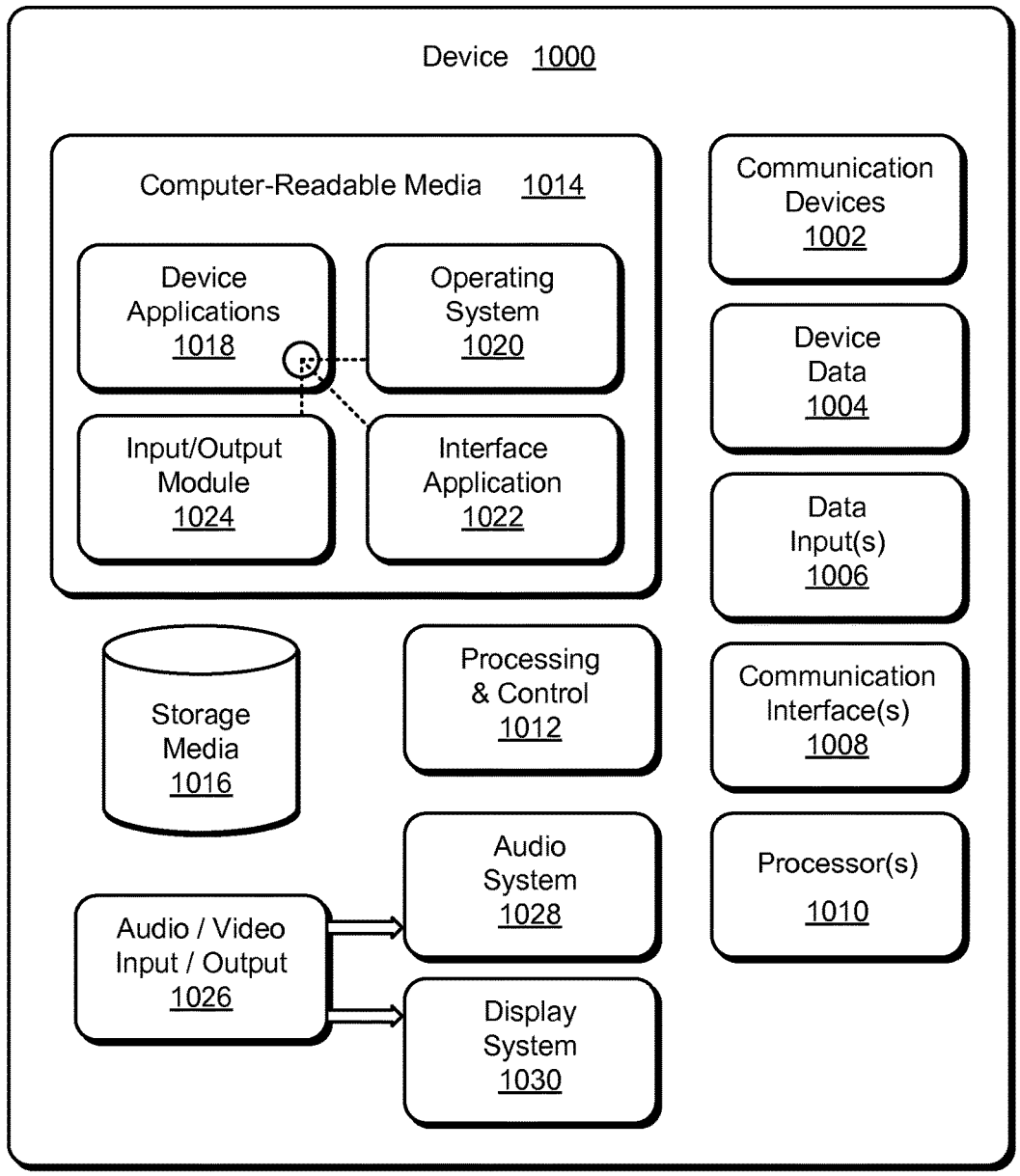
FIG. 10 illustrates an example system including various components of an example device that can be implemented as any type of computing device as described with reference to FIGS. 1-9 to implement embodiments of the techniques described herein.

FIG. 10 illustrates various components of an example device 1000 that can be implemented as any type of computing device as described with reference to FIGS. 1, 2, and 9 to implement embodiments of the techniques described herein. Device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device, media content stored on the device, and/or information associated with a user of the device. Media content stored on device 1000 can include any type of audio, video, and/or image data. Device 1000 includes one or more data inputs 1006 via which any type of data, media content, and/or inputs can be received, such as user-selectable inputs, messages, music, television media content, recorded video content, and any other type of audio, video, and/or image data received from any content and/or data source.

Device 1000 also includes communication interfaces 1008 that can be implemented as any one or more of a serial and/or parallel interface, a wireless interface, any type of network interface, a modem, and as any other type of communication interface. The communication interfaces 1008 provide a connection and/or communication links between device 1000 and a communication network by which other electronic, computing, and communication devices communicate data with device 1000.

Device 1000 includes one or more processors 1010 (e.g., any of microprocessors, controllers, and the like) which process various computer-executable instructions to control the operation of device 1000 and to implement embodiments of the techniques described herein. Alternatively or in addition, device 1000 can be implemented with any one or combination of hardware, firmware, or fixed logic circuitry that is implemented in connection with processing and control circuits which are generally identified at 1012. Although not shown, device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1000 also includes computer-readable media 1014, such as one or more memory components, examples of which include random access memory (RAM), nonvolatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1000 can also include a mass storage media device 1016.

Computer-readable media 1014 provides data storage mechanisms to store the device data 1004, as well as various device applications 1018 and any other types of information and/or data related to operational aspects of device 1000. For example, an operating system 1020 can be maintained as a computer application with the computer-readable media 1014 and executed on processors 1010. The device applications 1018 can include a device manager (e.g., a control application, software application, signal processing and control module, code that is native to a particular device, a hardware abstraction layer for a particular device, etc.). The device applications 1018 also include any system components or modules to implement embodiments of the techniques described herein. In this example, the device applications 1018 include an interface application 1022 and an input/output module 1024 that are shown as software modules and/or computer applications. The input/output module 1024 is representative of software that is used to provide an interface with a device configured to capture inputs, such as a touchscreen, track pad, camera, microphone, and so on. Alternatively or in addition, the interface application 1022 and the input/output module 1024 can be implemented as hardware, software, firmware, or any combination thereof. Additionally, the input/output module 1024 may be configured to support multiple input devices, such as separate devices to capture visual and audio inputs, respectively.

Device 1000 also includes an audio and/or video input-output system 1026 that provides audio data to an audio system 1028 and/or provides video data to a display system 1030. The audio system 1028 and/or the display system 1030 can include any devices that process, display, and/or otherwise render audio, video, and image data. Video signals and audio signals can be communicated from device 1000 to an audio device and/or to a display device via an RF (radio frequency) link, S-video link, composite video link, component video link, DVI (digital video interface), analog audio connection, or other similar communication link. In an embodiment, the audio system 1028 and/or the display system 1030 are implemented as external components to device 1000. Alternatively, the audio system 1028 and/or the display system 1030 are implemented as integrated components of example device 1000.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   at least one processor; and
   at least one storage device, providing instructions from one or more modules, wherein the modules, when executed with the at least one processor, cause the at least one processor to perform operations comprising:
   collecting data from a plurality of terminals, the data describing wireless network access conditions experienced by respective said terminals;
   assigning historical bandwidth parameters that are based on the collected data from the plurality of terminals to one or more of a plurality of clusters of bandwidth parameters, the assigning based on historical network parameters associated with the data that are collected from the respective said terminals,
   wherein respective sets of bandwidth parameters are assigned to respective clusters based on a clustering of the historical network parameters that are derived from variable bandwidth observations made in multiple wireless network accesses from one or more terminals of the plurality of terminals, and wherein the respective clusters group the historical network parameters based on observed characteristics of the multiple wireless network accesses;
   receiving a request for wireless network access by a requesting terminal, the request containing one or more current network parameters associated with the requesting terminal at a time of the request;
   determining a plurality of the clusters of bandwidth parameters applicable to the requesting terminal at the time of the request based upon:
   identifying the current network parameters contained within the request being similar to historical network parameters of the determined clusters, based on comparing the observed characteristics associated with a respective cluster to observed characteristics of the wireless network access by the requesting terminal, and obtaining respective bandwidth parameters associated with the determined clusters; and distributing the respective bandwidth parameters to the requesting terminal, the distributed bandwidth parameters usable by the requesting terminal to predict an amount of bandwidth that is available for a subsequent network communication between the requesting terminal and another terminal via the wireless network access.

2. The system of claim 1, wherein the wireless network access is used to perform a call, and wherein the call is configured to be performed peer-to-peer between the requesting terminal that formed the request and the another terminal.

3. The system of claim 1, wherein the predicted amount of bandwidth is formed using the distributed bandwidth parameters as part of a model by the requesting terminal.

4. The system of claim 3, wherein the model employs one or more quality-of-service measures.

5. The system of claim 1, further comprising adjusting at least one of the distributed bandwidth parameters based on observations made during the wireless network access and using the adjusted distributed bandwidth parameters to predict an adjusted amount of bandwidth that is available for the wireless network access.

6. The system of claim 1, wherein the wireless network access is used to perform a call, and wherein the current network parameters describe devices and other infrastructure that is to be involved during the call.

7. The system of claim 1, wherein the observed characteristics associated with a respective cluster that are compared to the observed characteristics of the requesting terminal include one or more of: a network provider, a signal strength, a network communication device, a wireless access point, a geographical location, a network access type, a network protocol, a time of day, a day of week, a subscription information, or a roaming information.

8. The system of claim 3, wherein the model is a statistical model or employs machine learning.

9. A method comprising:
    collecting data from a plurality of terminals, the data describing wireless network access conditions experienced by respective said terminals;
    assigning historical bandwidth parameters that are based on the collected data from the plurality of terminals to one or more of a plurality of clusters of bandwidth parameters, the assigning based on historical network parameters associated with the data that are collected from the respective said terminals,
    wherein respective sets of bandwidth parameters are assigned to respective clusters based on a clustering of the historical network parameters that are derived from variable bandwidth observations made in multiple wireless network accesses from one or more terminals of the plurality of terminals, and wherein the respective clusters group the historical network parameters based on observed characteristics of the multiple wireless network accesses;
    receiving a request for wireless network access by a requesting terminal, the request containing one or more current network parameters associated with the requesting terminal at a time of the request;
    determining a plurality of the clusters of bandwidth parameters applicable to the requesting terminal at the time of the request based upon:
        identifying the current network parameters contained within the request being similar to historical network parameters of the determined clusters, based on comparing the observed characteristics associated with a respective cluster to observed characteristics of the wireless network access by the requesting terminal, and
        obtaining respective bandwidth parameters associated with the determined clusters; and
    distributing the respective bandwidth parameters to the requesting terminal, the distributed bandwidth parameters usable by the requesting terminal to predict an amount of bandwidth that is available for a subsequent network communication between the requesting terminal and another terminal via the wireless network access.

10. The method of claim 9, wherein the wireless network access is used to perform a call, and wherein the call is configured to be performed peer-to-peer between the requesting terminal that formed the request and the another terminal.

11. The method of claim 10, wherein the current network parameters describe devices and other infrastructure that is to be involved in the call.

12. The method of claim 11, wherein the observed characteristics associated with a respective cluster that are compared to the observed characteristics of the requesting terminal include one or more of: network provider, signal strength, network communication device, wireless access point, geographical location, network access type, network protocol, time of day, day of week, subscription information, or roaming information.

13. The method of claim 9, wherein the predicted amount of bandwidth is formed using the distributed bandwidth parameters as part of a model by the requesting terminal.

14. The method of claim 13, wherein the model employs one or more quality-of-service measures.

15. One or more computer-readable hardware storage media having instructions stored thereon that, responsive to execution by a computing device, causes the computing device to perform operations comprising:
    collecting data from a plurality of terminals, the data describing wireless network access conditions experienced by respective said terminals;
    assigning historical bandwidth parameters that are based on the collected data from the plurality of terminals to one or more of a plurality of clusters of bandwidth parameters, the assigning based on historical network parameters associated with the data that are collected from the respective said terminals,
    wherein respective sets of bandwidth parameters are assigned to respective clusters based on a clustering of the historical network parameters that are derived from variable bandwidth observations made in multiple wireless network accesses from one or more terminals of the plurality of terminals, and wherein the respective clusters group the historical network parameters based on observed characteristics of the multiple wireless network accesses;
    receiving a request for wireless network access by a requesting terminal, the request containing one or more current network parameters associated with the requesting terminal at a time of the request;
    determining a plurality of the clusters of bandwidth parameters applicable to the requesting terminal at the time of the request based upon:
        identifying the current network parameters contained within the request being similar to historical network parameters of the determined clusters, based on comparing the observed characteristics associated with a respective cluster to observed characteristics of the wireless network access by the requesting terminal, and obtaining respective bandwidth parameters associated with the determined clusters; and distributing the respective bandwidth parameters to the requesting terminal, the distributed bandwidth parameters usable by the requesting terminal to predict an amount of bandwidth that is available for a subsequent network communication between the requesting terminal and another terminal via the wireless network access.

16. The computer-readable hardware storage media of claim 15, wherein the wireless network access is used to perform a call, and wherein the call is configured to be performed peer-to-peer between the requesting terminal that formed the request and the another terminal.

17. The computer-readable hardware storage media of claim 16, wherein the current network parameters describe devices and other infrastructure that is to be involved in the call.

18. The computer-readable hardware storage media of claim 17, wherein the observed characteristics associated with a respective cluster that are compared to the observed characteristics of the requesting terminal include one or more of: network provider, signal strength, network communication device, wireless access point, geographical location, network access type, network protocol, time of day, day of week, subscription information, or roaming information.

19. The computer-readable hardware storage media of claim 15, wherein the predicted amount of bandwidth is formed using the distributed bandwidth parameters as part of a model by the requesting terminal.

20. The computer-readable hardware storage media of claim 19, wherein the model employs one or more quality-of-service measures.

* * * * *